United States Patent [19]

Makihara et al.

[11] 3,889,234

[45] June 10, 1975

[54] FEATURE EXTRACTOR OF CHARACTER AND FIGURE

[75] Inventors: Hiroshi Makihara, Kodaira; Toshihiro Hananoi, Matsudo; Yoshiji Fujimoto, Hachioji, all of Japan

[73] Assignee: Hitachi, Ltd., Japan

[22] Filed: Oct. 4, 1973

[21] Appl. No.: 403,391

[30] Foreign Application Priority Data

| | | |
|---|---|---|
| Oct. 6, 1972 | Japan | 47-99805 |
| Feb. 28, 1973 | Japan | 48-23165 |
| Apr. 9, 1973 | Japan | 48-39457 |

[52] U.S. Cl. .......... 340/146.3 MA

[51] Int. Cl. .......... G06k 9/12

[58] Field of Search .......... 340/146.3 H, 146.3 AC, 340/146.3 MA, 172.5

[56] References Cited

UNITED STATES PATENTS

| | | | |
|---|---|---|---|
| 3,522,586 | 8/1970 | Kazuo Kiji et al. | 340/146.3 MA |
| 3,541,511 | 11/1970 | Genchi et al. | 340/146.3 AC |
| 3,634,823 | 1/1972 | Dietrich et al. | 340/146.3 MA |
| 3,753,229 | 8/1973 | Beun et al. | 340/146.3 H |

*Primary Examiner*—Gareth D. Shaw
*Assistant Examiner*—Leo H. Boudreau
*Attorney, Agent, or Firm*—Craig & Antonelli

[57] ABSTRACT

From a register in which a two-valued pattern is stored there is sequentially extracted information along three vertical scanning lines, from which information over the region of 3 by 3 bits is selectively extracted in succession by means of data selectors. Features are searched by comparing the thus extracted information with a mask having a predetermined pattern in bits. The feature extractor of character and figure is adapted to store the variety, coordinate and total number of the thus searched features to separate registers for comparison with the features of standard characters.

9 Claims, 18 Drawing Figures

FIG. 8a
| | | |
|---|---|---|
| X | X | X |
| c | I | a |
| d | I | b |
FIG. 8b
| | | |
|---|---|---|
| X | X | X |
| O | I | X |
| I | O | X |
FIG. 8c
| | | |
|---|---|---|
| d | c | X |
| I | I | X |
| b | a | X |
FIG. 8d
| | | |
|---|---|---|
| I | O | X |
| O | I | X |
| X | X | X |
FIG. 8e
| | | |
|---|---|---|
| b | I | d |
| a | I | c |
| X | X | X |
FIG. 8f
| | | |
|---|---|---|
| X | O | I |
| X | I | O |
| X | X | X |
FIG. 8g
| | | |
|---|---|---|
| X | a | b |
| X | I | I |
| X | c | d |
FIG. 8h
| | | |
|---|---|---|
| X | X | X |
| X | I | O |
| X | O | I |
FIG. 9
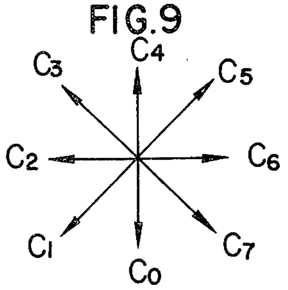
FIG. 10
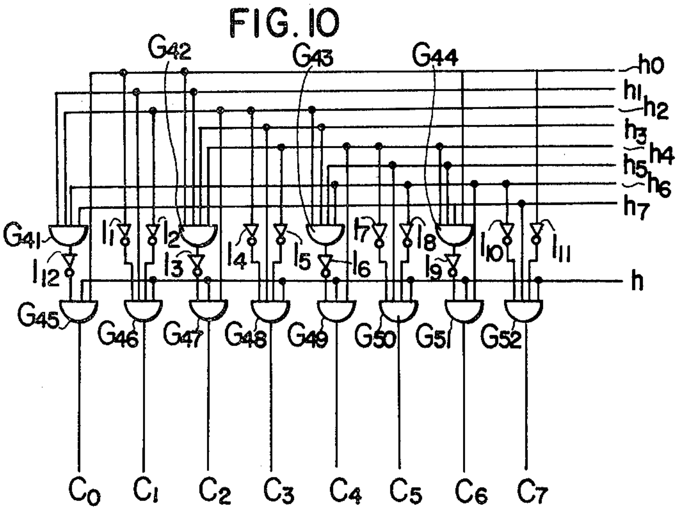

FEATURE EXTRACTOR OF CHARACTER AND FIGURE

BACKGROUND OF THE INVENTION

1. FIELD OF THE INVENTION

The present invention relates to a feature extractor of character and figure adapted for use with an optical character reader (OCR) for reading handwritten characters, and more particularly to a feature extractor for searching the features of character such as edges (edge points) or cross points (branch points) of patterns at high speed in the recognition of the handwritten characters in accordance with a central line search method.

2. DESCRIPTION OF THE PRIOR ART

In recognizing handwritten characters in accordance with a central line search method, unknown patterns are first transformed to thinned characters having a width of one bit to search the features such as the edge or branch point for each thinned character. The thinned character is then subjected to the analysis of feature distribution with the aid of suitable hardwares or softwares and identified with an associated character upon identification thereof with standard patterns in a dictionary while being rejected upon non-identification. These features are necessarily required to prevent the line elements of character from being overlooked which include such separated line elements as would be seen in Japanese characters such as "*p*" or "=". In order to search the features of character, the thinned patterns stored in a memory have conventionally been taken out to a register in succession for searching by software. However, the increase in the number of bits constituting the character disadvantageously results in the increase in time required to detect the features thereof.

SUMMARY OF THE INVENTION

A main object of the present invention is to provide a feature extractor for searching the coordinate, number and variety of features of character in a shorter time than by software.

Another object of the present invention is to provide a feature extractor constituted of relatively simple logic circuits.

In order to attain these objects, the present invention is characterized in that a two-valued pattern undergoes two-dimensional scanning with the aid of masks having a predetermined pattern using simple logic circuits without using any software.

Further a feature extractor according to the present invention is provided with logic circuits for storing the coordinate, number and variety of the features extracted by the scanning to separate registers and counters, respectively.

The other objects and features of the present invention will be apparent from the following detailed description when read in conjunction with the accompanying drawings.

Figures 1, 2:
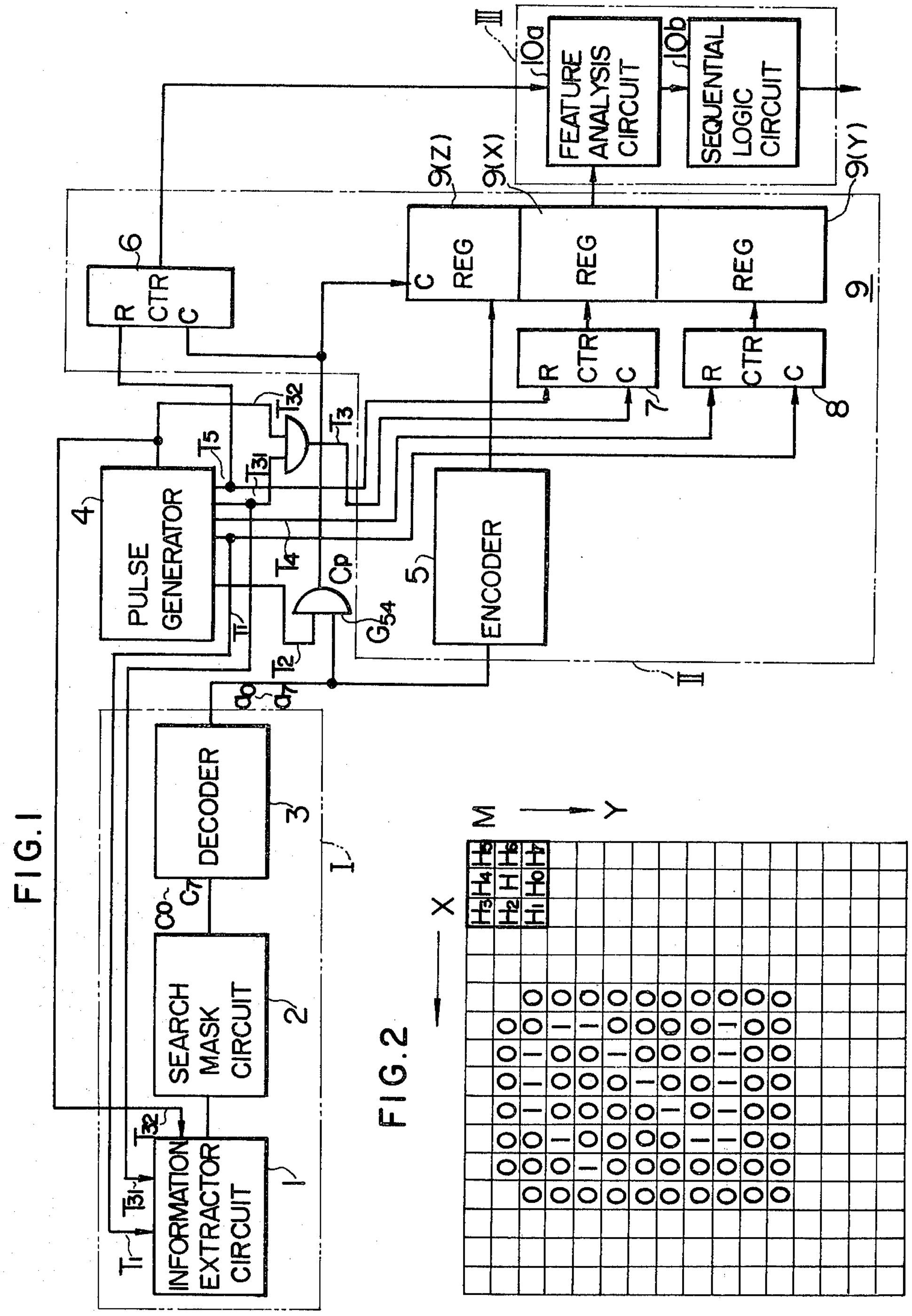
FIG. 1 is a block diagram showing one embodiment of the present invention.
FIG. 2 is an illustrative view of a two-valued pattern.

FIGG. 3 is a block diagram showing a feature extractor portion I in FIG. 1.

Figure 4:
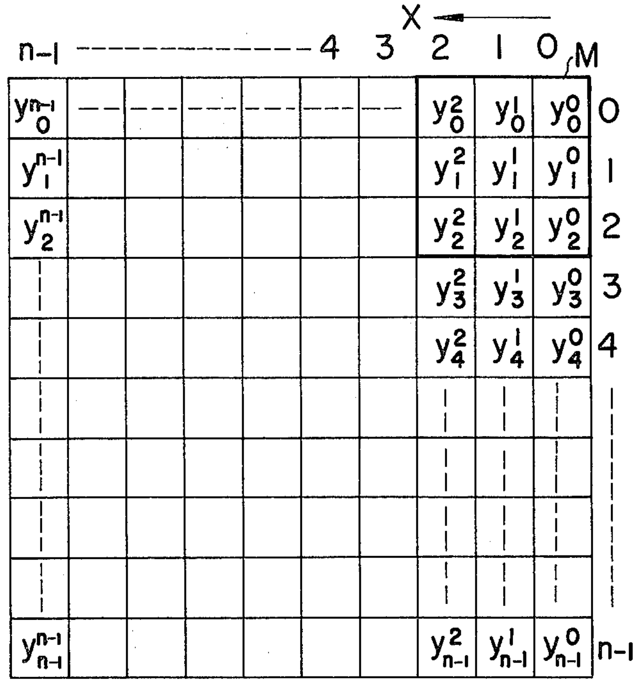

FIG. 4 is an illustrative view of information extraction over a predetermined region.

Figure 5:
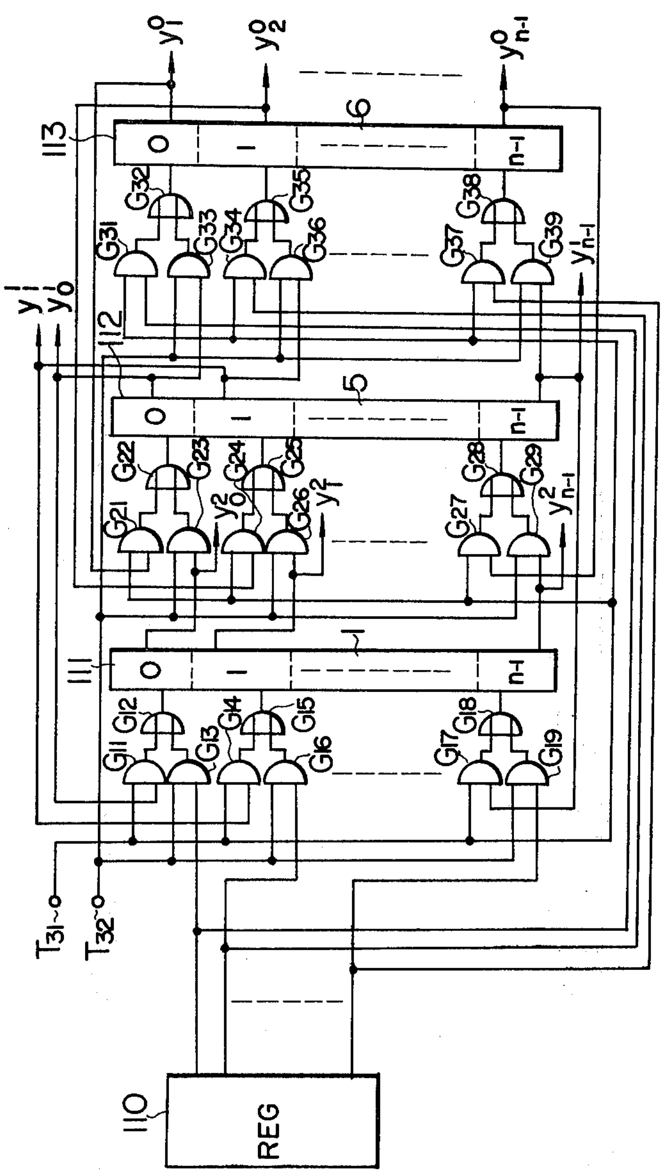

FIG. 5 is a circuit diagram showing an information extractor circuit in the feature extractor portion I.

Figure 6:
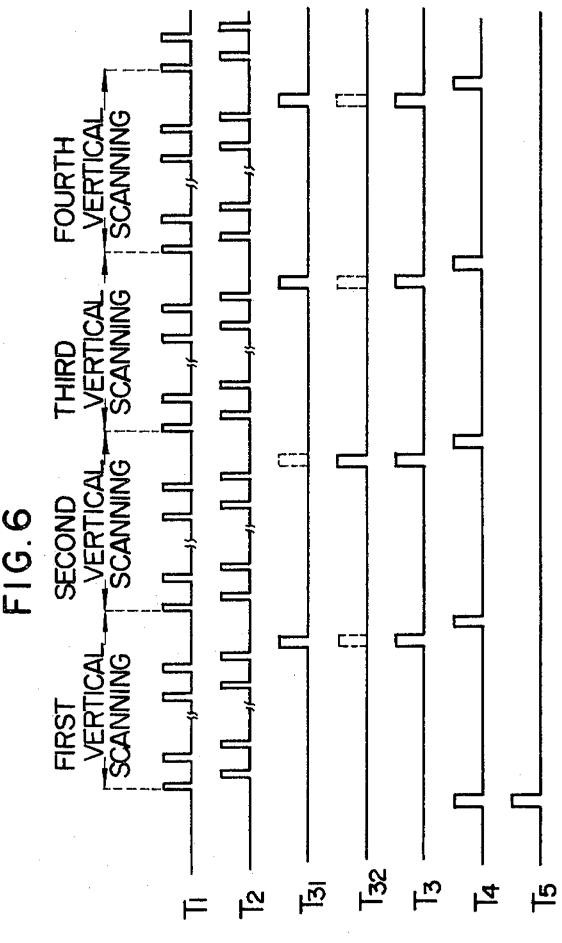

FIG. 6 is a time chart showing synchronism of timing pulses.

Figure 7:
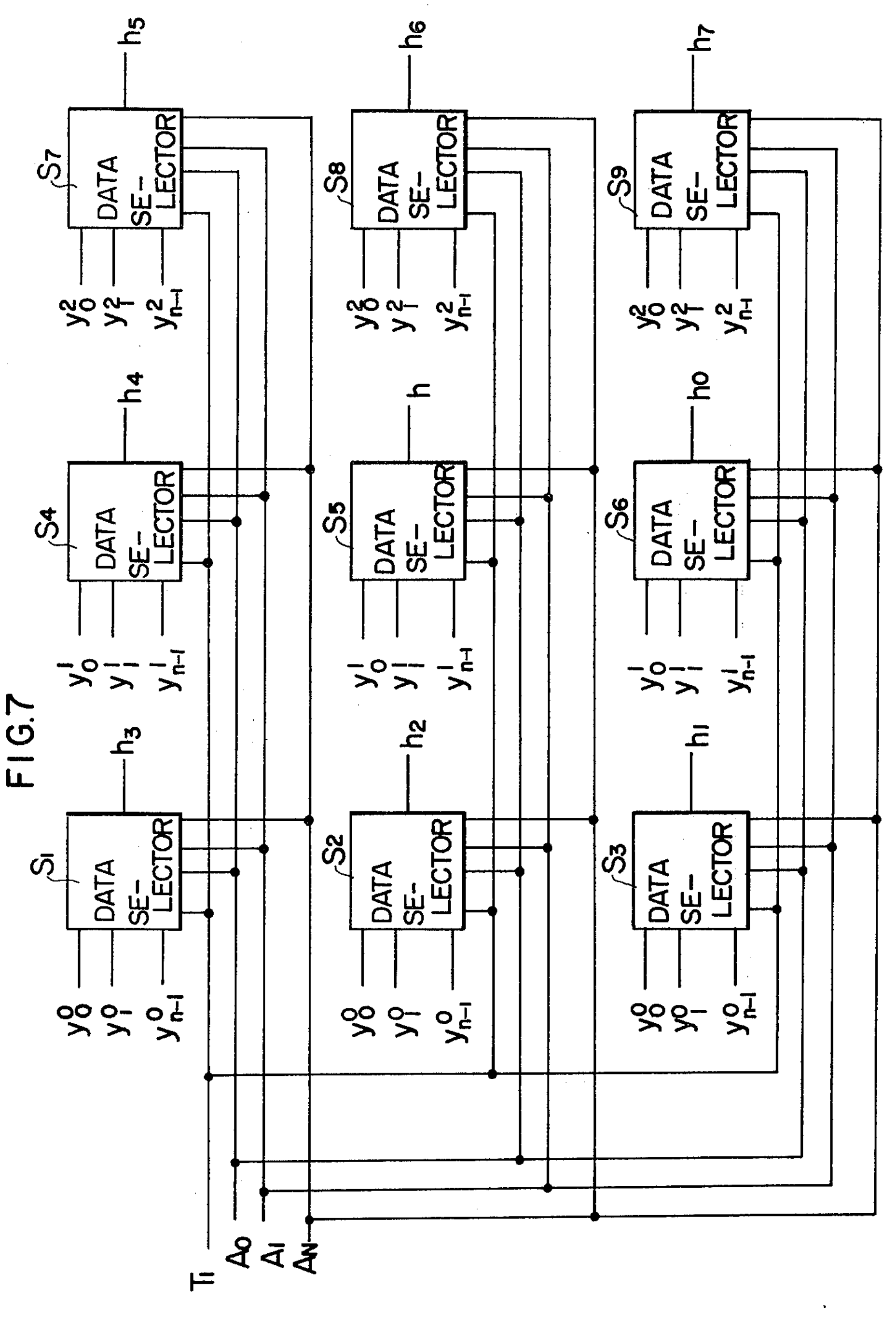

FIG. 7 is a circuit diagram showing a data selector in the feature extractor portion I.

FIGS. 8*a* to 8*h* are illustrative views of a search mask.

FIG. 9 is an illustrative view of feature extraction.

FIG. 10 is a circuit diagram showing a search mask circuit in the feature extractor portion I.

Figure 11:
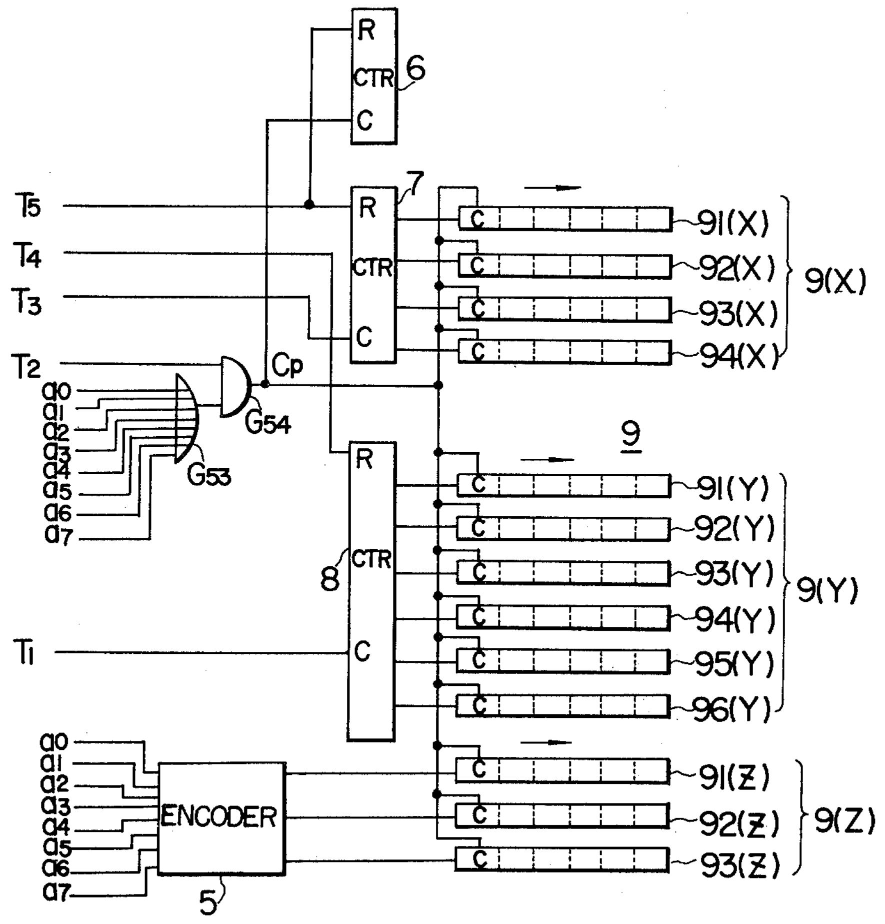

FIG. 11 is a block diagram showing an information storage portion II in FIG. 1. DESCRIPTION OF THE PREFERRED EMBODIMENTS In FIG. 1 there is shown one embodiment of the present invention comprising a feature extractor portion I, a feature information storage portion II, and a feature analysis portion III, each of which is controlled in synchronism with signals from a timing signal generator 4.

The feature extractor portion I includes an information extractor circuit 1, a masking circuit 2 and a decoder 3.

The information extractor circuit 1 serves as a circuit for effecting successive extraction of information over a partial region from a register in which two-valved thinned character information is stored.

For example, for such a two-valued pattern as shown in FIG. 2, a region M of 3 by 3 bits is successively scanned in directions of Y and X for successive extraction of the information over a portion corresponding to the region M. For convenience of the description, the region M will be described as having 3 by 3 bits although it is not restricted thereto but may have $n$ by $m$ bits ($n$, $m$ being any integer number).

Figure 3:
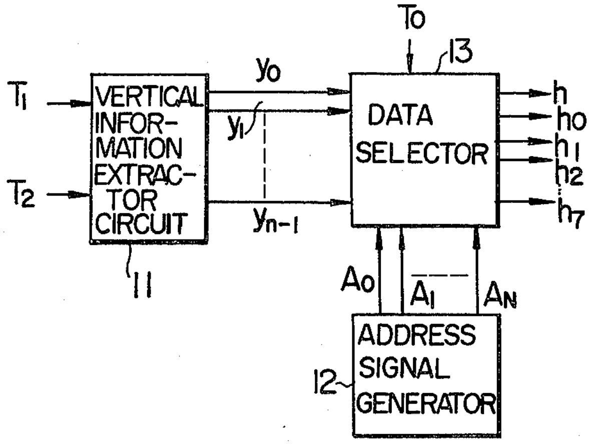

FIG. 3 shows the arrangement of the information extractor circuit comprising a vertical information extractor circuit 11 for extracting data along three successive vertical scanning lines from the register in which the two-valued characters are stored, an address signal generator 12 for addressing any region in the data area defined by the three vertical scanning lines, and a data selector 13 for providing outputs of 3 by 3 bit information addressed by the address signals. Assuming, for example, that each bit information from the two-valued character storing register is expressed as $y_o^o$ to $y_{n^-1}^{n-1}$ as shown in FIG. 4, then the vertical information extractor circuit 11 first extracts informations $y_o^o$ to $y_{n^-1}^o$ along the first vertical scanning line, informations $y_o^1$ to $y_{n^-1}^1$ along the second vertical scanning line and informations $y_o^2$ to $y_n^{-2}$ along the third vertical scanning line. At the same time, the address signal generator 12 generates address signals $A_o$ to $A_N$ for addressing (Y = 0, 1, 2). This permits the informations $y_o^o$, $y_1^o$, $y_2^o$, $y_o^1$, $y_1^1$, $y_2^1$, $y_o^2$, $y_1^2$, $y_2^2$ over the shown region M to be obtained from the data selector 13. The successive generation of the address signals from the address signal generator 12 for addressing (Y = 1, 2, 3), (Y = 2, 3, 4), - - -, (Y = n–3, n–2, n–1) makes it possible to scan the region M in the direction of Y.

A particular embodiment of the vertical information extractor circuit 11 will be described in connection with FIG. 5, in which there is shown a register 110 for storing the two-valued information of character andd figure as shown in FIG. 2. The outputs from the register 110 are applied to the first register 111 having capacity of n bits in parallel mode through AND gates $G_{13}$, $G_{16}$, $G_{19}$ and OR gates $G_{12}$, $G_{15}$, $G_{18}$. The outputs from the first register 111 are applied to the second register 112 through AND gates $G_{23}$, $G_{26}$, $G_{29}$ and OR gates $G_{22}$, $G_{25}$, $G_{28}$. Further the outputs from the second register 112 are applied to the third register 113 through AND gates $G_{33}$, $G_{36}$, $G_{39}$ and OR gates $G_{32}$, $G_{35}$, $G_{38}$. These register 111, 112, 113 have the capacity of n bits, respectively, to the corresponding bits of which the informations along the one vertical scanning line are stored, respectively. The outputs from the register 110 on which the two valued character and figure are stored are simultaneously applied to the third register 113 through AND gates $G_{31}$, $G_{34}$, $G_{37}$ and OR gates $G_{32}$, $G_{35}$, $G_{38}$ while the outputs from the third register 113 are applied to the second register 112 through AND gates $G_{21}$, $G_{24}$, $G_{27}$ annd OR gates $G_{22}$, $G_{25}$, $G_{28}$. Further the outputs from the second register 112 are applied to the first register 111 through AND gates $G_{11}$, $G_{14}$, $G_{17}$ and OR gates $G_{12}$, $G_{15}$, $G_{18}$.

With such an arrangement, the application of the first timing pulse $T_{31}$ as shown in FIG. 6 causes the informations $y_o^o$ to $y_n{}^-{}_1{}^o$ along the one vertical scanning line of X = 0 in the register 110 to be set to the first register 111. The application of the following second timing pulse $T_{31}$ causes the informations $y_o^o$ to $y_n^{-o}$ set in the first register 111 to be set to the second register 112 and the informations $y_o^1$ to $y_n^{-1}$ along the one vertical scanning line of X = 1 in the register 110 to be set to the first register in replacement therewith. Further, the application of the third timing pulse $T_{31}$ causes the informations stored in the second register 112 to be set to the third register 113 and the informations stored in the first register 111 to be set to the second register 112, further causing the informations $y_o^2$ to $y_n{}^-{}_1{}^2$ along the one vertical scanning line of X = 2 in the register 110 to be set to the first register 111. In this way, the application of every one timing pulse $T_{31}$ causes the informations along one vertical scanning line to be shifted rightward in succession to set the data along the three successive scanning lines to the first to third registers, respectively. In other words, the data along the three vertical scanning lines can be extracted successively in order of X = 0 to X = n-1.

The successive application of the timing pulses $T_{32}$, on the other hand, causes the contents of the third and second registers 113, 112 to be shifted to the second and first registers 112 and 111, respectively, as will be apparent from the gate connections in the figure. That is, the data stored on each register are shifted in the leftward direction. Thus, the data are permitted to be scanned over the register 110 in the direction of X = 0 to X = n-1, or X = n-1 to X = 0 depending on whether the timing pulse of $T_{31}$ or $T_{32}$ is applied.

In a state where the first data along the three vertical scanning lines, i.e., those of X = 0, 1, 2 are set to the third, second and first registers, respectively, the informations of $y_o^2$ to $y_n{}^-{}_1{}^2$, $y_o^1$ to $y_n{}^-{}_1{}^1$, and $y_o^o$ to $y_n^{-o}$ are, respectively, obtained from the first, second and third registers. These informations are applied to the data selector 13.

FIG. 7 illustrates the data selector circuit 13. In the figure there are shown well known data selectors $S_1$, $S_2$, - - - , $S_9$ serving to extract the informations addressed by the address signals $A_o$, $A_1$ - - - $A_N$ from the input informations $y_o$ to $y_n{}^-{}_1$. To the first column of data selectors $S_1$, $S_2$, $S_3$ there are applied the data $y_o^o$ to $y_n{}^-{}_1{}^o$, to the second column of data selectors $S_4$, $S_5$, $S_6$ there are applied the data $y_o^1$ to $y_n^{-1}$ and to the third column of data selectors $S_7$, $S_8$, $S_9$ there are applied the data $y_o^2$ to $y_n^{-2}$.

The application of a timing pulse $T_1$ in state wehre Y = 0, 1, 2 in FIG. 4 are addressed by the address signals $A_o$, $A_1$, - - - , $A_N$ permits the data over the region (X = 0, 1, 2, Y = 0, 1, 2) to be selected and generated from the data selectors $S_1$ to $S_9$. Similarly, the addressing of Y = 1, 2, 3 by the address signals $A_o$, $A_1$, - - - $A_N$ permits the data over the region (X = 0, 1, 2, Y 32 1, 2, 3) to be selected and generated from the data selectors $S_1$ to $S_9$. The detailed description of the particular arrangement of such data selectors will be here omitted because they are generally known. Thus, the data along the vertical scanning lines set to the first to third registers 111 to 113 are selectively extracted by 3 by 3 bits by successively addressing the contents by the address signals. In other words, the same effect as that of scanning the region M in FIG. 4 in the Y direction is obtained.

Accordingly, if the region M is shifted one by one bit in the direction of Y to complete the one vertical scanning annd thereafter is shifted one bit from the position shown in FIG. 4 into the direction of X, then the informations over each region can be extracted. It is to be noted that outputs $h$, $h_o$, $h_1$, - - - , $h_7$ from the data selectors $S_1$ to $S_9$ correspond to the informations located at each bit position H, $H_o$, $H_1$, - - - , $H_7$ over the region M in FIG. 2.

The informations of 3 by 3 bits which are thus selectively extracted are then applied to the search mask circuit 2.

The search mask circuit 2 serves to search the features such as edges or branch points existing in the two-valued pattern of the extracted region, and has, for example, two-valued patterns as shown in FIGS. 8a to 8h. In the figures, X may be either zero or one, and the condition of $a.b.c.d = 0$ is assumed. A mask of FIG. 8a is used to search the branches in the direction of $C_o$ in FIG. 9 and masks of FIGS. 8b to 8h are used to search the branches in the directions of $C_1$ to $C_7$ in FIG. 9.

The coincidence of one of the masks with the pattern of the 3 by 3 bit region extracted from the two-valued pattern shown in FIG. 2 is ascertained by the search mask circuit 2.

The search mask circuit 2 includes AND circuits $G_{41}$ to $G_{52}$ and inverters $I_1$ to $I_{12}$, as shown in FIG. 10, and generates outputs $C_o$ to $C_7$ when the masks of FIGS. 8a to 8h coincide with the extracted pattern, respectively. In other words, the outputs $C_o$ to $C_7$ turn out to be 1 only when the branches corresponding to the directions of $C_o$ to $C_7$ are found out to exist in the extracted pattern.

It will, therefore, be appreciated that three output of 1 of the outputs $C_o$ to $C_7$ prove the existence of a three branching point (trifurcation), four outputs of 1 a four branching point (cross point), one output of 1 an edge point, and two outputs of 1 a continuous line.

The decoder 3 serves to discriminate the variety of the features in response to the signals $C_o$ to $C_7$ representative of the line direction of the thinned character. Such a decoder is conventionally well known and comprises a fixed memory for providing outputs $a_o$ to $a_7$ representative of the features corresponding to the signals $C_o$ to $C_7$ in dependence on the combination of the signals $C_o$ to $C_7$ with each other.

The thus obtained output signals $a_o$ to $a_7$ from the decoder 3 are then applied to an encoder 5, which serves to convert the outputs $a_0$ to $a_7$ from the decoder 3 to signals of several bits which are previously determined depending upon the variety of the features. At the same time, the signals $a_0$ to $a_7$ are applied to a counter 6 through an AND gate $G_{54}$. The counter 6 serves to count the total number of the features.

On the other hand, a clock pulse generator 4 generates timing clock pulses $T_1$ to $T_6$ (FIG. 6) having a predetermined period as will be described hereinafter, the clock pulses being applied to the information extractor circuit 1, counters 6, 7, 8 and a shift register 9, respectively. The counters 7 and 8 serves to count the coordinate of the region M scanning the two-valued pattern in FIG. 2 as will be described below, the counted coordinate being applied to the shift register 9. The latter comprises a group of registers 9 (Z) for storing the information corresponding to the variety of the features, and groups of X and Y registers 9(X) and 9(Y) for storing the informations corresponding to the X and Y coordinates of the features. The output from the counter 6 representative of the total number of the features and the output from the shift register 9 representative of the variety and coordinate thereof are applied to a feature analysis circuit 10*a*, the outputs from which are checked by a sequential logic circuit 10*b* to discriminate the input patterns. The step of checking the analysis of the features with the dictionary may be effected completely by software.

The particular arrangement of the feature information storage portion II in FIG. 1 will be described in connection with FIG. 11.

In FIG. 11, to an OR gate $G_{53}$ there is applied the signals $a_0$ to $a_7$ from the decoder 3 representative of the presence of the features and variety thereof. On the other hand, from the clock pulse generator 4 there are generated the timing pulses $T_1$ to $T_5$ as shown in FIG. 6, which are applied to terminals as shown in FIG. 11, respectively. The timing pulse $T_1$ synchronizes with displacement in which the region M is shifted over the two-valued pattern in FIG. 2 one by one bit in the vertical direction, and the pulse $T_1$ is applied to a clock terminal C of the Y counter 8 as well as to the information extractor circuit 1 for extracting the information of 3 by 3 bits from the two-valued pattern. The timing pulse $T_2$, having the same period as the timing pulse $T_1$ but appearing slightly later than it, is applied to the AND gate $G_{54}$ to apply the output from the OR gate $G_{53}$ to the counter 6 and to the clock terminals of the shift register 9. In other words, the information of 3 by 3 bits are read out in synchronism with the pulses $T_1$ to write-in the information representative of the presence or absence of the features and variety thereof to the shift register 9 and the counter 6 in synchronism with the timing pulses $T_2$. The timing pulse $T_3$ synchronizes with a period of time of the one vertical scanning over the region M and is applied to the clock terminal C of the X counter 7. The timing pulse $T_4$ has the same period as the pulse $T_3$ and appears slightly later than the pulse $T_3$ for application to the reset terminal R of the Y counter 8. The timing pulse $T_5$ is generated for application to the reset terminals of the counters 6 and 7 when the region M shown in FIG. 2 has finished the complete scanning over the entire surface of the two-valued pattern (therefore the pulse $T_5$ appearing to a slight extent later than the pulse $T_4$). All the counters 6, 7 and 8 are counted up upon application of the clock pulse to the terminal C and has their count contents reset upon application of the pulse to the resettng terminal R. The binary codes representative of the counts of the X and Y counters 7 and 8 are applied to the group of X registers 9(X) and the group of Y registers 9(Y) in parallel mode, respectively, and are shifted one bit in the direction of arrows for every time of application of the clock pulses to the terminals C of the registers.

In this embodiment, the group of X registers 9(X) has been shown as including therein four registers 91(X) to 94(X) while the group of Y registers 9(Y) has been shown as including therein six registers 91(Y) to 96(Y) with the X and Y coordinates represented with four and six bits, but the embodiments of the present invention are not restricted thereto but a plurality of registers may be used.

On the other hand, the signals $a_0$ to $a_7$ representative of the presence or absence and variety of the features are applied to the encoder 5 and converted to the 3-bit codes previously determined depending on the variety of each feature and for application to the registers 91(Z), 92(Z) and 93(Z) corresponding to each bit. In this case, it is to be noted that the total number of the group of registers 9(Z) may be optionally selected.

If all the counters 6, 7 and 8 are assumed to be reset in their initial states, then they are counted up one by one for every application of the timing pulses $T_1$. The timing pulses $T_1$ are generated in synchronism with motion in which the mask M is shifted over the two-valued pattern one by one bit in the vertical direction (Y direction), so that the content of the counter 8 represents the Y coordinate of the scanning position over the mask. The counter 8 is reset by the timing pulse $T_4$ after the shift corresponding to the one vertical scanning has been completed. The counter 7 is then counted up by one by the timing pulse $T_3$ to shift the region M one bit in the horizontal (X) direction for next vertical scanning. Accordingly, the content of the counter 7 indicates the X coordinate of the scanning position of the region M which scans the two-valued pattern.

If any of the signals $a_0$ to $a_7$ representative of the features is turned out to be 1 by some timing pulse $T_1$, then an output $C_p$ is generated from the AND gate $G_{54}$ by the pulse $T_2$ generated halfway by a time of generation of the next pulse $T_1$, thereby causing the counter 6 to be counted up by one and the outputs from the counters 6, 7 and encoder 5 to be registered to the corresponding groups of shift registers 9(X), 9(Y) and 9(Z). That is, on the registers there is stored the information that the feature of the kind indicated by the register 9(Z) exists at the coordinate ($X_o$, $Y_o$) indicated by the groups of registers 9(X) and 9(Y). Thus, the contents of the shift registers are shifted one by one for every extraction of the features with the contents thereof renewed simultaneously.

Upon completion of the scanning over the predetermined region the counter 6 is provided with the total number of features extracted. The coordinate and variety of the features are discriminated on the basis of the contents of the groups of shift registers 9(X), 9(Y) and 9(Z). The counters 6 and 7 are reset by the resetting pulse $T_5$ after the contents of the counter 6 and shift register 9 has been transmitted to the feature analysis circuit 10.

It is to be noted, in the above embodiment, that the search masks for extracting the features of the characters and figures therefrom have been exemplified with the eight varieties as shown in FIGS. 8*a* to 8*h* but may be increased in number depending on the feature to be extracted without being restricted thereto. It will further be appreciated that even the use of a plurality of search masks makes it possible to extract all the features by once scanning the whole surface over the two-valued pattern.

We claim:

1. A feature extractor of character and figure comprising:

first register means for storing a thinned, two-valued pattern of the character and figure;

information extractor means including n second register means for receiving from said first register means information along n consecutive predetermined scanning lines in said pattern of the character and figure, address signal generator means for generating address signals which address m positions in each of said predetermined scanning lines, and data selector means for receiving information from said second register means and said address signal generator means to simultaneously generate information of *n* by *m*, where n and m are integers;

search mask circuit means for searching coincidence of information extracted by said information extractor means with patterns of search masks each having a predetermined pattern representative of the feature after comparison therewith;

counter means for counting the number of feature signals searched by said search mask circuit means to obtain the total number of the features;

third register means for storing signals representative of the variety of the signal searched by said search mask circuit means; and fourth register means for storing signals representative of the coordinate on the character and figure of the feature signals searched by said search mask circuit means.

2. A feature extractor according to claim 1, wherein said n second register means receives from said first register means information along n consecutive vertical scanning lines and said address signal generator means generates address signals which address m positions in each of said vertical scanning lines.

3. A feature extractor according to claim 2, wherein said search mask circuit means provides an output of feature signals indicative of each coincidence of the information extracted by said information extractor means and the predetermined patterns of said search mask.

4. A feature extractor according to claim 3, wherein said counter means counts the number of feature signals provided by said search mask circuit means, said third register means stores signals representative of the variety of the feature signals provided by said search mask circuit means, and said fourth register means stores signals representative of the coordinate on the character and figure of the feature signals provided by said search mask circuit means.

5. A feature extractor according to claim 1, wherein said n second register means are parallel connected registers.

6. A feature extractor according to claim 5, further comprising gating means connected between said parallel connected registers and between said first register means and said parallel connected registers.

7. A feature extractor according to claim 3, further comprising decoder means for discriminating the variety of features in accordance with the feature output signals of said search mask circuit means, said decoder means providing output signals to said counter means.

8. A feature extractor according to claim 7, further comprising encoder means responsive to the output signals of said decoder means for providing signals representative of the variety of features discriminated to said third register means.

9. A feature extractor according to claim 1, wherein said search mask circuit means includes search masks for detecting edge points and branch points.

* * * * *